3,149,973
WET AND DRY STRIPPING FILM
Alan M. Winchell, Binghamton, N.Y., assignor to General Aniline & Film Corporation, New York, N.Y., a corporation of Delaware
No Drawing. Filed Nov. 2, 1961, Ser. No. 149,521
8 Claims. (Cl. 96—83)

This invention relates to photographic films and more particularly, to photographic stripping films having improved wet and dry stripping characteristics.

Stripping films contain a permanent support and a temporary support and depend for their stripping characteristics on a special interlayer joining the temporary and permanent supports. The adhesion between this interlayer and the temporary support should be sufficient to permit emulsion coating and other film handling operations, but the adhesion should be low enough to permit continuous and rapid stripping of the permanent support from the temporary support at any time after development. Stripping films are well known in the art and are described in the literature and U.S. patents including U.S. 2,088,145; 2,089,460; 2,266,435; 2,275,617; 2,300,905; 2,614,932 and 2,638,417.

The normal manner of using stripping films includes the stripping of the emulsion layer and its permanent support from the temporary layer and placing the wet strip film emulsion side down on a smooth glass plate. In advertising photography it is frequently necessary to cut off sections of a transfer photograph and replace them by other suitable insertions such as lettering or other pictures. Thus, it becomes necessary to remove part or all of the strip film from the glass plate, usually after the film has dried. This dry stripping is a very delicate operation because the thin emulsion membrane can easily be damaged.

The manufacture of a stripping film is very difficult because of the inherent properties which the film must possess. Thus, the stripping film must be so constructed that the permanent layer will remain attached to the temporary layer during normal film handling including emulsion coating, exposure and development and yet be able to be easily stripped after development. Additionally, the emulsion membrane must be able to be cemented to a smooth glass plate while wet and yet be able to be stripped from the glass while it is dry.

Heretofore, the stripping films of the prior art did not possess wet and dry stripping characteristics which were completely satisfactory. Thus, it was very common for the emulsion membrane to tear as it was being stripped from the glass plate after it had dried. It is immediately obvious that any damage to the emulsion membrrane would necessitate the taking of a new picture followed by developing and transferring, etc., with the risk that the new picture would also be damaged when it was being dry stripped.

Therefore, it is the object of this invention to provide a stripping film capable of being wet and dry stripped without any damage to the membrane consisting of the permanent support and the gelatin layer bearing the silver image.

It has now been found that the above object can be obtained by the use of a special interlayer in a conventional stripping film.

The interlayer, used to removably bond the permanent to the temporary support, is either an emulsion of polyethylene or a styrene-maleic anhydride copolymer emulsion. It has been discovered that when the above two materials are used as interlayers in a stripping film improved wet and dry stripping characteristics are obtained.

The polyethylene emulsion interlayer is prepared by taking an emulsifiable polyethylene, water and suitable agents and processing them according to conventional emulsifying techniques. Emulsifiable polyethylenes are well known in the art and are commercially available. Examples of these polyethylenes include those sold under the trademark AC 629 and AC 729 by Allied Chemical Company. As has heretofore been pointed out, the polyethylene emulsions are prepared by emulsifying polyethylenes with water and other conventional agents such as acids, e.g., oleic acid and amines such as morpholine.

The styrene-maleic anhydride copolymer emulsions which are employed as interlayers in this invention are also well known in the art and commercially available. An example of a suitable emulsion is marketed under the trademark Lytron 680 by Monsanto Chemical Company.

In another aspect of this invention, it is possible to further enhance the wet and dry stripping characteristics of a stripping film by the inclusion of a carbonate or sulfite salt into the interlayer. These salts are reactive in acidic solutions such as fixers and evolve carbon dioxide and sulfur dioxide. The evolution of gas is important since it influences the degree of adhesion after processing the stripping film, making it easier to strip the temporary support from the permanent support. Examples of suitable salts include sodium carbonate, potassium bicarbonate, potassium sulfite, sodium sulfite, etc.

The amount of salt added to the interlayer is not narrowly critical and can vary over a wide range. However, it has been found that 2% by weight based on the interlayer formulation is satisfactory.

The stripping film of this invention employs a temporary support of either a polycarbonate, polystyrene, cellulose triacetate, or Cronar, a polyester sold by E. I. du Pont de Nemours & Co. The permanent support can be a polycarbonate or cellulose nitrate. It is to be understood that the above supports are well known in the art and numerous variations will immediately suggest themselves to one skilled in the art.

The invention will be illustrated by the following examples but it is to be understood that the invention is not restricted thereto.

*Example I*

A strip film was prepared using a cellulose triacetate as the temporary support and a cellulose nitrate permanent support. The interlayer was applied from a dip pan using conventional equipment for applying thin layers and consisted of the following:

| | Ml. |
|---|---|
| Lytron 680 emulsion | 6 |
| Water | 94 |
| | 100 |

The temporary support was coated with the interlayer, a 9 micron permanent support layer, a gelatin sub layer and finally a 7 micron layer of a conventional gelatin silver halide emulsion. The membrane was found to adhere sufficiently before processing so preliminary edge lifting did not occur. After being processed in graphic arts developing solutions the membrane did not float free of the temporary support but could be easily peeled off when wet. The stripping was smooth and equal to any satisfactory wet stripping film. When the film was dry the membrane stripped with more tension than desired but not enough to cause the membrane to tear or crease when removed.

*Example II*

A solution as in Example I with 2% sodium carbonate added was used to apply the interlayer. Under identical preparation and testing conditions the membrane wet stripped ideally and dry stripped in a satisfactory manner. When the dry processed membrane can be cut with a razor blade so that the edges of the line do not lift but still the edges can easily be lifted to remove sections, the dry stripping characteristics are considered satisfactory.

*Example III*

The procedure of Example I was repeated with the exception that the interlayer had the following composition:

| | |
|---|---|
| Water ml | 97 |
| Sodium bicarbonate grams | 2 |
| Lytron 680 ml | 3 |

The resulting film had excellent wet and dry stripping properties.

*Example IV*

A polyethylene emulsion was formulated from the following ingredients:

| | Grams |
|---|---|
| AC 629 Polyethylene [1] | 40 |
| Morpholine | 8 |
| Oleic acid | 8 |
| Water | 184 |

[1] AC 629 Polyethylene is a white, tough, wax-like polymer having properties:

| | °F. |
|---|---|
| Melting point | 204–212 |
| Acid number | 11–15 |
| Saponification number | 11–15 |

An interlayer was prepared by using 1 ml. of the above emulsion and 99 ml. of water and a stripping film was prepared as in Example I. The resulting film had excellent wet and dry stripping properties.

This invention is capable of numerous modifications and variations and is not to be limited except as necessitated by the appended claims.

What is claimed is:

1. A photographic stripping film comprising a temporary film support, a permanent film support carrying a light-sensitive silver halide emulsion and an interlayer between said permanent and temporary supports, said interlayer being a resin selected from the class consisting of polyethylene and a copolymer of styrene-maleic anhydride, said resin being coated from an aqueous emulsion thereof.

2. The article of claim 1 wherein said permanent support is cellulose nitrate.

3. The article of claim 1 wherein said temporary support is cellulose triacetate.

4. The article of claim 1 wherein a salt selected from the class consisting of carbonate and sulfite salts is added to the interlayer.

5. The article of claim 1 wherein the interlayer contains a salt selected from the class consisting of sodium carbonate, sodium bicarbonate and sodium sulfite.

6. A photographic stripping film comprising a cellulose nitrate support carrying a gelatin silver halide emulsion, an interlayer of a polyethylene resin coated from an aqueous emulsion of the resin, and cellulose triacetate as a temporary support.

7. A photographic stripping film comprising a cellulose nitrate support carrying a gelatin silver halide emulsion, an interlayer of a copolymer of styrene and maleic anhydride coated from an aqueous emulsion of said copolymer and a temporary support of cellulose triacetate.

8. The article as defined in claim 1 wherein the temporary support is selected from the class consisting of a film of a polycarbonate, polystyrene, cellulose triacetate and a polyester and wherein said permanent support is a film selected from the class consisting of polycarbonate and cellulose nitrate.

References Cited in the file of this patent

UNITED STATES PATENTS

| | | |
|---|---|---|
| 2,143,791 | Nadeau | Jan. 10, 1939 |
| 2,216,736 | Carothers | Oct. 8, 1940 |
| 2,391,171 | Lane | Dec. 18, 1945 |
| 2,559,645 | Larsen et al. | July 10, 1951 |
| 3,007,901 | Minsk | Nov. 7, 1961 |
| 3,024,180 | McGraw | Mar. 6, 1962 |

FOREIGN PATENTS

| | | |
|---|---|---|
| 788,513 | Great Britain | Jan. 2, 1958 |